(12) United States Patent
Zhang et al.

(10) Patent No.: US 10,883,387 B2
(45) Date of Patent: Jan. 5, 2021

(54) GAS TURBINE EXHAUST DIFFUSER WITH AIR INJECTION

(71) Applicant: General Electric Company, Schenectady, NY (US)

(72) Inventors: Hua Zhang, Greenville, SC (US); Laxmikant Merchant, Bangalore (IN); Bradly Aaron Kippel, Greenville, SC (US); Valery Ivanovich Ponyavin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 434 days.

(21) Appl. No.: 15/062,958

(22) Filed: Mar. 7, 2016

(65) Prior Publication Data

US 2017/0254222 A1 Sep. 7, 2017

(51) Int. Cl.
*F01D 25/30* (2006.01)
*F01D 9/06* (2006.01)
*F01N 3/029* (2006.01)
*F02C 7/141* (2006.01)
*F02C 7/18* (2006.01)

(52) U.S. Cl.
CPC .......... *F01D 25/305* (2013.01); *F01D 9/065* (2013.01); *F01N 3/0293* (2013.01); *F02C 7/141* (2013.01); *F02C 7/18* (2013.01); *F01N 2270/02* (2013.01); *F05D 2270/17* (2013.01)

(58) Field of Classification Search
CPC .... F01N 3/082; F01N 2270/02; F01N 3/0293; F05D 2270/173; F05D 2260/20; F05D 2260/234; F02K 9/82; F04D 29/542; F02C 7/14; F02C 7/141; F02C 7/18; F01D 25/30; F01D 25/305; F01D 9/065; F01D 25/08; F01D 25/12; F01D 5/08; F01D 5/081; F01D 5/082; F01D 5/085
See application file for complete search history.

(56) References Cited

U.S. PATENT DOCUMENTS 4,989,406 A * 2/1991 Vdoviak ............... F01D 25/162
  244/117 A
7,040,097 B2 * 5/2006 Mukherjee ............. F01D 5/186
  60/775

(Continued)

OTHER PUBLICATIONS

Suad Jakirlic et al., "UFR 4-16 Test Case", 2015, ERCOFTAC, retrieved May 4, 2018, http://qnet-ercoftac.cfms.org.uk/w/index.php/UFR_4-16_Test_Case.*

(Continued)

*Primary Examiner* — Gerald L Sung
*Assistant Examiner* — Stephanie Cheng
(74) *Attorney, Agent, or Firm* — Fletcher Yoder, P.C.

(57) ABSTRACT

A gas turbine system includes an exhaust processing system that may process exhaust gas generated by a gas turbine engine, the exhaust processing system includes an exhaust diffuser that may receive the exhaust gas from a turbine of the gas turbine engine and having an annular passage disposed between an inner annular wall and an outer annular wall, and an air injection assembly disposed within the exhaust diffuser. The air injection assembly includes one or more air injection conduits disposed within the annular passage of the exhaust diffuser and including fluid injection holes that may direct a cooling fluid into a first mixing region of the exhaust diffuser.

19 Claims, 5 Drawing Sheets

(56) References Cited

U.S. PATENT DOCUMENTS

| | | | |
|---|---|---|---|
| 7,069,716 B1 | 7/2006 | Childers | |
| 7,316,539 B2 * | 1/2008 | Campbell | F01D 5/146 244/123.1 |
| 8,186,152 B2 | 5/2012 | Zhang et al. | |
| 8,257,025 B2 * | 9/2012 | Little | F01D 25/14 415/115 |
| 8,516,786 B2 * | 8/2013 | Zhang | F01D 25/305 60/39.182 |
| 8,596,073 B2 | 12/2013 | Zhang | |
| 9,611,756 B2 * | 4/2017 | Biyani | F01D 25/14 |
| 9,677,475 B2 * | 6/2017 | Merry | F02C 3/10 |
| 10,221,720 B2 * | 3/2019 | Nolcheff | F01D 9/04 |
| 2005/0056313 A1 * | 3/2005 | Hagen | B01F 5/0453 137/3 |
| 2010/0226767 A1 * | 9/2010 | Becker | F01D 9/02 415/207 |
| 2011/0058939 A1 * | 3/2011 | Orosa | F01D 25/305 415/208.1 |
| 2012/0186261 A1 | 7/2012 | Toprani et al. | |
| 2013/0152592 A1 * | 6/2013 | Orosa | F02K 1/386 60/772 |
| 2014/0373504 A1 * | 12/2014 | Broker | F01D 25/30 60/39.5 |
| 2015/0089955 A1 * | 4/2015 | Knapp | F02C 6/08 60/782 |
| 2015/0118015 A1 * | 4/2015 | Matys | F01D 25/305 415/1 |
| 2015/0204247 A1 * | 7/2015 | Doebbeling | F01D 25/30 60/772 |
| 2017/0342863 A1 * | 11/2017 | Muskat | F01D 9/041 |

OTHER PUBLICATIONS

Extended European Search Report and Opinion issued in connection with corresponding EP Application No. 17159517.6 dated Jul. 27, 2017.

* cited by examiner

GAS TURBINE EXHAUST DIFFUSER WITH AIR INJECTION

BACKGROUND OF THE INVENTION

The subject matter disclosed herein relates to turbine systems and, more specifically, to systems and methods for injecting cooling air into exhaust gas flow(s) produced by turbine systems.

Gas turbine systems typically include at least one gas turbine engine having a compressor, a combustor, and a turbine. The combustor is configured to combust a mixture of fuel and compressed air to generate hot combustion gases, which, in turn, drive blades of the turbine. Exhaust gas produced by the gas turbine engine may include certain byproducts, such as nitrogen oxides ($NO_x$), sulfur oxides ($SO_x$), carbon oxides ($CO_x$), and unburned hydrocarbons. In general, it is desirable to remove or substantially reduce the amount of such byproducts in the exhaust gas prior to releasing the exhaust gas into the atmosphere.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a gas turbine system includes an exhaust processing system that may process exhaust gas generated by a gas turbine engine, the exhaust processing system includes an exhaust diffuser that may receive the exhaust gas from a turbine of the gas turbine engine and having an annular passage disposed between an inner annular wall and an outer annular wall, and an air injection assembly disposed within the exhaust diffuser. The air injection assembly includes one or more air injection conduits disposed within the annular passage of the exhaust diffuser and including fluid injection holes that may direct a cooling fluid into a first mixing region of the exhaust diffuser.

In a second embodiment, an exhaust diffuser includes a center body extending at least a portion of a length of the exhaust diffuser and an outer annular wall circumferentially surrounding the center body. The outer annular wall defines an annular passage that may receive exhaust gas from a turbine of a gas turbine engine. The exhaust diffuser also includes an air injection assembly that may supply a cooling fluid into a region of the exhaust diffuser downstream from the center body.

In a third embodiment, a gas turbine system includes an air injection assembly disposed within an exhaust diffuser. The air injection assembly includes a plurality of air injection conduits disposed between an inner annular wall and an outer annular wall of the exhaust diffuser, and the air injection assembly may supply a cooling fluid to the exhaust diffuser to cool an exhaust gas stream generated in a gas turbine engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
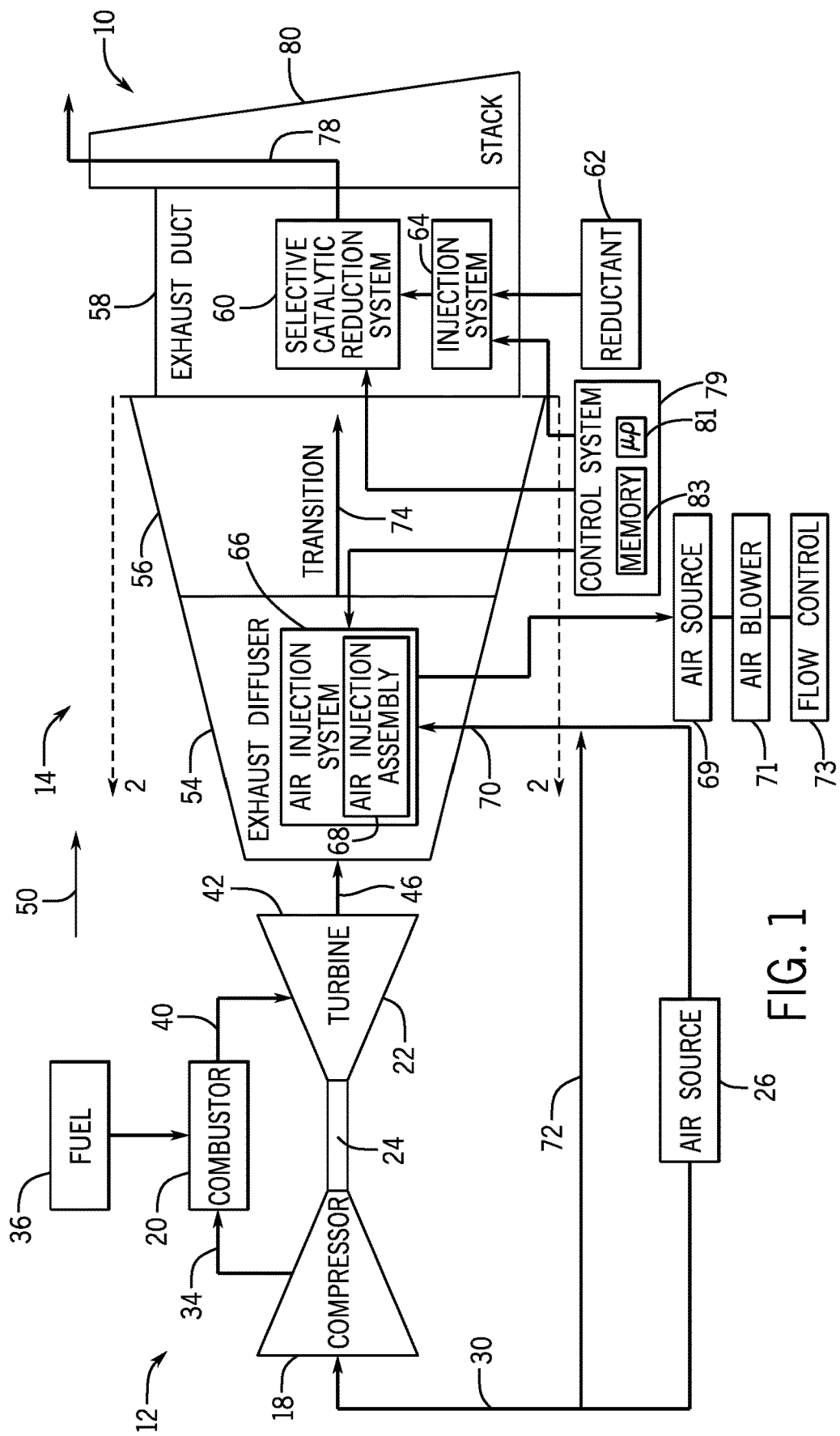
FIG. 1 is a block diagram of a gas turbine system including air injection features for cooling exhaust gases, in accordance with an embodiment of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments are generally directed toward techniques for cooling or tempering exhaust gases (e.g., flue gas)

generated in gas turbine systems. For example, in gas turbine systems, one or more gas turbine engines may combust a fuel/oxidant mixture to produce combustion gases for driving one or more turbine stages, each having a plurality of blades. Depending on a number of factors, such as the type of fuel that is combusted as well as various combustion parameters, combustion products resulting from the combustion process may include nitrogen oxides ($NO_x$), sulfur oxides ($SO_x$), carbon oxides ($CO_x$), and unburned hydrocarbons. Often, the composition of exhaust gases released by gas turbine systems, such as in a gas turbine power generation plant, may be subject to stringent regulatory requirements. By way of non-limiting example, regulations may require that the $NO_x$ concentration of the exhaust gas released by the system be no greater than a threshold level, such as 3 parts-per-million (ppm).

One technique for removing or reducing the amount of $NO_x$ in an exhaust gas stream is by Selective Catalytic Reduction (SCR). In an SCR process, a reductant, such as ammonia ($NH_3$) is injected into the exhaust gas stream and reacts with the $NO_x$, in the presence of a catalyst (e.g., a metal oxide), to produce nitrogen ($N_2$) and water ($H_2O$). The effectiveness of the SCR process may be at least partially dependent upon the temperature of the exhaust gas that is processed. For instance, the SCR process for removing $NO_x$ may be particularly effective at temperatures of approximately 500 to 900 degrees Fahrenheit (° F.). Thus, when a temperature of the exhaust gas is higher than the effective temperature range for SCR, it may be beneficial to cool the exhaust gases prior to SCR to increase the effectiveness of the SCR process (e.g., removal of $NO_x$).

In accordance with present embodiments, the exhaust gases may be cooled using a cooling system that injects a cooling/tempering fluid (e.g., air) into an exhaust gas flow upstream of the SCR. Certain gas turbine systems may include the cooling system within a transition section of the gas turbine system that couples an exhaust diffuser of the gas turbine system to the SCR. The cooling system may use air fans to blow the cooling fluid into the transition section against backpressure created by the exhaust gas flow through the transition section. An amount of the cooling fluid used to cool the exhaust gas to the desired temperature within the transition section may be between approximately 10% and approximately 50% of exhaust gas volume for heavy duty gas turbines. Such a large volume may reduce turbine efficiency due, in part, to an undesirable pressure drop across the system.

It is now recognized that exhaust gases and the cooling fluid may have non-uniform mixing within the transition section due, in part, to inefficient diffusion of the exhaust gases in the exhaust diffuser and/or a short residence time of the exhaust gases and cooling fluid mixture in the transition section. The non-uniform mixing of the exhaust gases and the cooling fluid may result in hot spots within the exhaust gas/cooling fluid mixture, where the hotspots in the mixture include regions having temperatures above the temperature range for SCR. As such, the SCR process may not effectively remove or reduce $NO_x$ in the exhaust gases. Accordingly, it is now recognized that it may be desirable to improve exhaust gas/cooling fluid mixing upstream of the SCR.

As discussed in further detail below, embodiments of the present disclosure include a gas turbine system, such as a simple cycle heavy-duty gas turbine system, having an air injection assembly configured to inject cooling air into an exhaust gas stream. As will be described further below, the air injection assembly may be disposed downstream (i.e., relative to the flow of exhaust gases) of a turbine, but upstream of an SCR system. For example, the air injection assembly may include air injection features disposed within an exhaust diffuser of the gas turbine engine system. The air injection features may include a manifold having a plurality of air injection conduits that inject the cooling fluid into the exhaust gas flow via a plurality of air injection holes. Placing the air injection features within the exhaust diffuser, rather than in the transition section, may increase a residence time of the exhaust gases and cooling fluid mixture in a passageway leading to the SCR.

With the foregoing in mind, FIG. 1 is a block diagram of an embodiment of a gas turbine system 10 that includes a gas turbine engine 12 and an exhaust processing system 14. In certain embodiments, the gas turbine system 10 may be all or a part of a power generation system. In the illustrated embodiment, the turbine system 10 is depicted as a simple cycle gas turbine system. However, in other embodiments, the gas turbine system 10 may be a combined cycle gas turbine system. The gas turbine system 10 may combust liquid or gas fuel, such as natural gas and/or a hydrogen-rich synthetic gas, to generate hot combustion gases to drive various features of the gas turbine system 10.

As shown in FIG. 1, the gas turbine engine 12 includes a compressor 18, a combustor section 20, and a turbine 22. The turbine 22 may be drivingly coupled to the compressor 18 via a shaft 24. In operation, air from air source 26 enters the turbine engine 12 through an air intake of the gas turbine engine 12, as shown by arrow 30, and is pressurized in the compressor 18. The compressor 18 may include a plurality of compressor blades coupled to the shaft 24. The compressor blades may be present in one or more stages, and the rotation of the shaft 24 causes rotation of the compressor blades. This rotation draws air into and through the compressor 18 and compresses the air for delivery to the combustor section 20.

The combustor section 20 may include one or more combustors. In one embodiment, a plurality of combustors may be disposed at multiple circumferential positions in a generally circular or annular configuration about the shaft 24. As compressed air 34 exits the compressor 18 and enters the combustor section 20, the compressed air 34 may be mixed with fuel 36 from a fuel source for combustion within the combustors. For example, the combustors may include one or more fuel nozzles that inject a fuel-air mixture into the combustors in a suitable ratio for combustion, emissions control, fuel consumption, power output, and so forth. The combustion of the air and fuel generates hot pressurized exhaust gases 40, which may then be utilized to drive one or more turbine stages (each having a plurality of turbine blades) within the turbine 22. In operation, the combustion gases (e.g., the exhaust gases 40) flowing into and through the turbine 22 flow against and between the turbine blades, thereby driving the turbine blades and, thus, the shaft 24 into rotation. The shaft 24 may be used to drive a load, such as an electrical generator in a power plant. As discussed above, the rotation of the shaft 24 also causes blades within the compressor 18 to draw in and pressurize the air received by the intake.

The exhaust gases 40 that flow through the turbine 22 may exit a turbine downstream end 42 as an exhaust gas stream 46. The exhaust gas stream 46 may continue to flow in a downstream direction 50 toward the exhaust processing system 14. For instance, the turbine downstream end 42 may be fluidly coupled to the exhaust processing system 14 configured to reduce levels of certain combustor products in the exhaust gas stream 46, such as $NO_x$, $SO_x$, and $CO_x$. More specifically, in the illustrated embodiment, the exhaust gas stream 46 exits the turbine downstream end 42 and flows into an exhaust diffuser 54. As set forth above, the exhaust diffuser 54 includes certain air injection features configured to facilitate mixing of the exhaust gas stream 46 with cooling air.

Following the exhaust diffuser 54, the exhaust gas stream 46 may flow into a transition section 56 that couples the exhaust diffuser 54 to an exhaust duct 58. The exhaust duct 58 includes an SCR system 60 configured to perform an SCR process for removing $NO_x$ from the exhaust gas stream 46. For example, a reductant 62 (e.g., ammonia ($NH_3$)) is injected via an injection system 64 into the exhaust gas duct 58 and reacts with the $NO_x$ to produce nitrogen ($N_2$) and water ($H_2O$). As will be appreciated, the effectiveness of this SCR process may be at least partially dependent upon the temperature of the exhaust gas that is processed. For instance, the SCR process for removing $NO_x$ may be particularly effective at temperatures of approximately 500 to 900 degrees Fahrenheit (° F.). In certain embodiments, however, the exhaust gas stream 46 exiting the turbine 22 and entering the exhaust processing system 14 may have a temperature of approximately 1000 to 1500 degrees ° F. or, more specifically, 1100 to 1200 degrees ° F. Accordingly, to increase the effectiveness of the SCR process for $NO_x$ removal, the exhaust processing system 14 may include an air injection system 66 having an injection assembly 68 that may inject a cooling fluid (e.g., air) into the exhaust gas stream 46, thereby cooling the exhaust gas stream 46 prior to the SCR process in the SCR system 60. The air injection system 66 may also include an air source 69 (which may be the same or different from the air source 26), one or more air blowers 71, and a flow control 73 (e.g., valves, pumps, sensors, etc.). It should be understood that the effective temperatures may vary depending on the element being removed from the exhaust gas stream 46 and/or the catalyst being employed in the SCR process.

As shown in FIG. 1, the air injection assembly 68 may be disposed within the exhaust diffuser 54. Positioning the air injection assembly 68 within the exhaust diffuser 54 may increase a residence time of a mixture of the exhaust gas stream 46 and a cooling fluid (e.g., cooling air 70) in the exhaust processing system 14. Therefore, the exhaust gas stream 46 and the cooling air 70 may mix for a longer period of time compared to injecting the cooling fluid in the transition section, thereby allowing more efficient cooling of the exhaust gases. As discussed in further detail below with reference to FIGS. 2 and 3, the air injection assembly 68 may include a manifold coupled to a center body of the exhaust diffuser 54. The manifold may include a plurality of injection air holes that inject the cooling air 70 provided by one or more air sources 26 into the exhaust diffuser 54 for mixture with the exhaust gas stream 46. For instance, in one embodiment, the air source(s) 26 may include one or more air blowers, compressors (e.g., compressor 18), heat exchangers, or a combination thereof. In certain embodiments, a portion of the air 30 may bypass the compressor 18 and be directed to the air injection assembly 68, as shown by arrow 72. In other embodiments, compressor discharge air from the compressor 18 may be directed to the air injection assembly 68.

The term "cooling," when used to describe the cooling air 70, is used herein to mean that the cooling air 70 is cooler relative to the exhaust gas stream 46 exiting the turbine 22. For example, the cooling air 70 supplied by the air source 26 may be ambient air, or may be further cooled using a heat exchanger or other type of suitable cooling mechanism. The air injection assembly 68 may also include one or more valves to regulate the flow of cooling air 70. By way of example, in one embodiment, the exhaust gas stream 46 output from the turbine 22 may flow into the exhaust diffuser 54 at a first flow rate of approximately 1000 pounds/second, and cooling air 70 may be injected into the exhaust diffuser 54 (via the air injection assembly 68) at a second flow rate dependent at least on the first flow rate and the temperature of the exhaust gas stream 46 and the temperature of the cooling air 70. For instance, the second flow rate may be between 1% and 75% of the first flow rate, such as 50%. It should be understood, however, that the flow rate of exhaust gas steam 46 and the flow rate of the cooling air 70 may vary based on a number of factors.

The cooling air 70 mixes with the exhaust gas stream 46 to produce a cooled exhaust gas stream 74 which, as discussed above, may have a temperature suitable for the SCR process. As will be discussed further below, positioning the air injection assembly 68 within the exhaust diffuser 54 may provide uniform mixing, thus achieving a uniform temperature and velocity distribution in the cooled exhaust gas 74 upstream of the SCR 60. Additionally, the configuration of the air injection assembly 68 may improve performance of the exhaust diffuser 54 by decreasing large wake and reverse flow regions that may result from structural components within the exhaust diffuser 54 (e.g., struts, center body), as discussed in detail below. Decreasing the wake and reverse flow regions within the exhaust diffuser 54 may allow the exhaust gas stream 64 to achieve a desirable velocity distribution such that pressure recovery and power output of the gas turbine system 10 may be improved relative to gas turbine systems that do not include an air injection assembly within the exhaust diffuser 54.

The cooled exhaust gas 74 may continue flowing downstream (e.g., in direction 50) through the transition section 56 and into the exhaust duct 58, where the cooled exhaust gas 74 undergoes treatment to remove NOx from the cooled exhaust stream 74 and generate a treated exhaust gas 78, as discussed above. In certain embodiments, the treated exhaust gas 78 may be released to the atmosphere via a stack 80 downstream from and coupled to the exhaust duct 58. The stack 80, in some embodiments, may include a silencer or muffler. In other embodiments, the treated exhaust gas 78 may be directed to other processes within the gas turbine system 10. By way of non-limiting example, the exhaust processing system 14 may utilize the air injection assembly 68 and the SCR system 60 to reduce the composition of $NO_x$ in the treated exhaust gas 78 to approximately 3 parts per million (ppm) or less.

The gas turbine system 10 may also include a controller 79 (e.g., an electronic and/or processor-based controller) to govern operation of the gas turbine system 10. The controller 79 may independently control operation of the air injection system 66, the SCR 60, and/or the injection system 64 by electrically communicating with sensors, control valves, and pumps, or other flow adjusting features throughout the system 10. In certain embodiments, the controller 79 may also control operation of the gas turbine engine 12 (e.g., the compressor 18, the combustor 20, and/or the turbine 22). The controller 79 may include a distributed control system (DCS) or any computer-based workstation that is fully or partially automated. For example, the controller 79 can be any device employing a general purpose or an application-specific processor (e.g., microprocessor 81), both of which may generally include memory circuitry (e.g., memory 83) for storing instructions such as cooling parameters (e.g., cooling air temperature and flow rate), SCR parameters, among others. The processor may include one or more processing devices, and the memory circuitry may include one or more tangible, non-transitory, machine-readable media collectively storing instructions executable by the processor to perform the acts of FIG. 8, and control actions described herein.

While certain embodiments of the present disclosure are generally directed to the processing and removal of $NO_x$ from the exhaust gas stream 46, other embodiments may enable the removal of other combustion byproducts, such as carbon monoxide and/or unburned hydrocarbons. As such, the supplied catalyst may vary depending on the composition that is being removed from the exhaust gas stream 46. Additionally, it should be understood that the embodiments disclosed herein are not limited to the use of one SCR system 60, but may also include multiple SCR systems 60. Still further, the system 10 may also include a continuous emissions monitoring (CEM) system that continuously monitors the composition of the treated exhaust gas 78 exiting the stack 80. If the CEM system detects that the composition of treated exhaust gas 78 fails to comply with one or more regulatory requirements, the CEM system may a provide notification to a control system (e.g., the controller 79) of the gas turbine engine 12, which may in turn take certain corrective actions to adjust combustion parameters, adjust flows of the cooling air 70, adjust operation of the SCR system 60, and so forth. Additionally or alternatively, a control system (e.g., the controller 79) of the gas turbine system 10 may perform functions such as notifying the operators of the system 10 to adjust operating parameters, perform service, or otherwise cease operating the system 10 until the treated exhaust gas 78 produced by the system 10 has a composition that is within a predetermined requirement. In some embodiments, the CEM system may also implement corrective actions specifically relating to the exhaust processing system 14 such as adjusting temperature, flow rates of cooling air 70, an amount of $NH_3$ injected into SCR system 60, etc.

Figure 2:
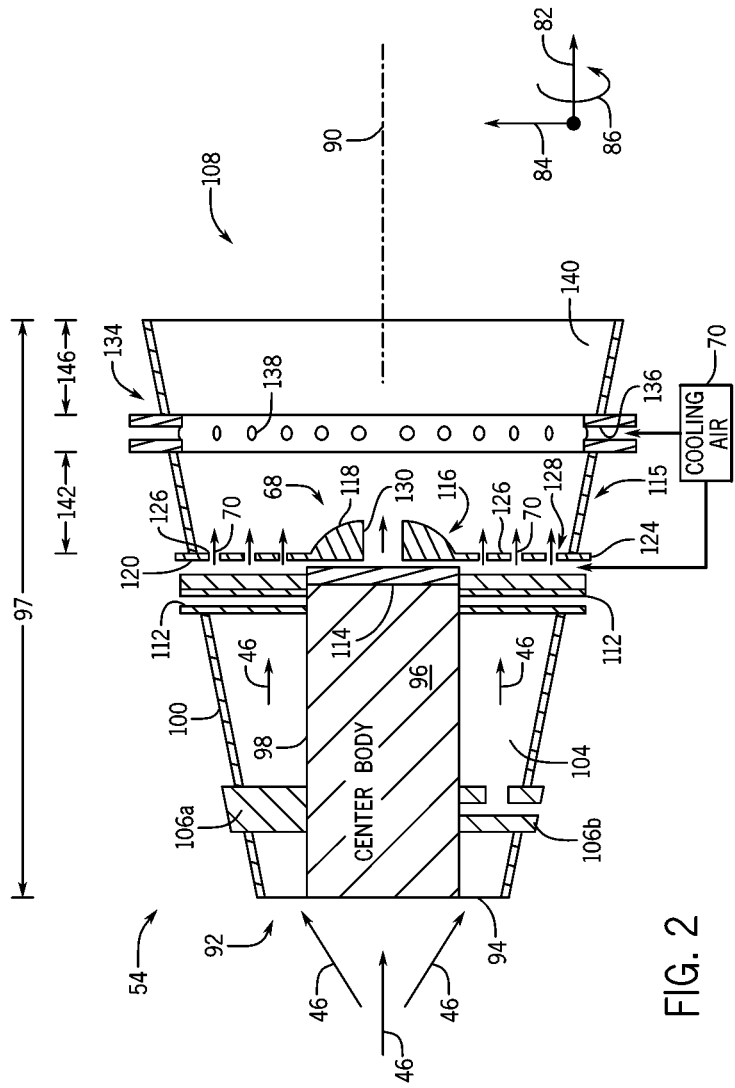
FIG. 2 is a cross-sectional view along line 2-2 of an exhaust diffuser of the gas turbine system of FIG. 1 and having air injection features, in accordance with an embodiment of the present disclosure.

Referring now to FIG. 2, a cross-sectional view of the exhaust diffuser 54 is illustrated, in accordance with one embodiment. To facilitate description, various aspects of the exhaust diffuser 54 may be described with reference to an axial direction or axis 82, a radial direction or axis 84, and a circumferential direction or axis 86 of the diffuser 54 (and the gas turbine engine 12). For example, the axis 82 corresponds to a longitudinal centerline 90 or lengthwise direction, the axis 84 corresponds to a crosswise or radial direction relative to the longitudinal centerline 90, and the axis 86 corresponds to the circumferential direction about the axial axis 82 (e.g., longitudinal centerline 90). A diffuser upstream end 92 of the exhaust diffuser 54 may include an annular opening 94 that fluidly couples the exhaust diffuser 54 to the turbine 22 to receive the exhaust gas stream 46. The exhaust diffuser 54 includes a center body 96 that extends at least a portion of a length 97 of the exhaust diffuser 54 along centerline 90. The center body 96 defines an annular inner wall 98 of the exhaust diffuser 54. In certain embodiments, the inner annular wall 98 may surround rotating components of the gas turbine engine 12. For example, the inner annular wall 98 may surround at least a portion of the shaft 24.

The exhaust diffuser 54 also includes an outer annular wall 100 radially 84 separated from the inner annular wall 98 and circumferentially 86 about the centerline axis 90. The outer annular wall 100 generally surrounds the inner annular wall 98 to define a fluid flow passage 104 through the exhaust diffuser 54 between the annular walls 98, 100. The exhaust diffuser 54 may be tapered such that the outer annular wall 100 increased in size in the circumferential direction 86 moving along the centerline 90. A plurality of struts 106 within the fluid flow passage 104 radially 84 extend between the inner annular wall 98 and the outer annular wall 100. The plurality of struts 106a, 106b are circumferentially 86 spaced about the axial axis 82 such that the exhaust gas stream 46 may flow between the plurality struts 106, through the fluid flow passage 104, and toward a downstream end 108 of the exhaust diffuser 54. The exhaust diffuser 54 may include any number of struts 106, such as between 1 and 20, e.g., 1, 2, 3, 4, 5, 6, 7, 8, 9, 10, or more. The struts 106 may be positioned adjacent to the annular opening 94 to minimize drag forces that may interfere with a flow of the exhaust gas stream 46 through the exhaust diffuser 54. However, the plurality of struts 106 may be positioned at any axial and circumferential position along the center body 96. In one embodiment, the plurality of struts 106 may have a solid center, as illustrated by the strut 106a. In another embodiment, the plurality of struts 106 may have a hollow center, as illustrated by the strut 106b. However, in certain embodiments, the plurality of struts 106 may include a combination of the solid center struts 106a and the hollow center struts 106b. As discussed in further detail below, the hollow center of the strut 106b may provide a flow path for injection of the cooling air 70 into the exhaust diffuser 54.

In addition to the struts 106, the exhaust diffuser 54 may also include a plurality of hollow struts 112 adjacent to a center body downstream end 114 that is opposite the annular opening 94. The plurality of hollow struts 112 radially 84 extend between the annular walls 98, 100 and are circumferentially 86 spaced apart about the centerline axis 90 of the exhaust diffuser 54. The plurality of hollow struts 112 may provide access for an individual into the fluid flow passage 104 (e.g., for maintenance and/or repairs). Both the plurality of struts 106 and the plurality of hollow struts 112 may provide structural support between the inner annular wall 98 and the outer annular wall 100 of the exhaust diffuser 54. As discussed in further detail below, hollow struts, such as the hollow struts 112, may cause large wake regions that may decrease performance of the exhaust diffuser 54. For example, large wake and reverse flow regions may decrease a power output of the exhaust gases exiting the exhaust diffuser 54, resulting in an undesirable pressure recovery and total pressure loss across the system 10. However, it is now recognized that integrating the air injection assembly 68 into the exhaust diffuser 54 improves the performance of the exhaust diffuser 54 may be improved compared to exhaust diffusers that do not include the air injection assembly.

The air injection assembly 68 may be fixedly or removably coupled to a center body downstream end 114. The air injection assembly 68 may supply the cooled air 70 to a first mixing region 115 within the exhaust diffuser 54. While in the first mixing region 115, the exhaust gas stream 46 may be diluted with the cooled air 70 (e.g., tempering air) to decrease a temperature of the exhaust gas stream 46. In the illustrated embodiment, the air injection assembly 68 includes a hub 116 coupled to the center body downstream end 114. In the illustrated embodiment, the hub 116 has a semicircular shape 118. However, in other embodiments, the hub 116 may have a conical shape or any other suitable shape. The hub 116 includes air injection conduits 120 radially 84 extending away from the hub 116 toward the outer annular wall 100. The air injection conduits 120 may be circumferentially 86 spaced about the axial axis 82 at different axial and circumferential positions along the center body 96. In certain embodiments, each air injection conduit 120 may be aligned (e.g., circumferentially) with a respective hollow strut 112. The hollow struts 112 may provide structural support and secure the air injection assembly 68 (e.g., via the air injection conduits 120) to the exhaust diffuser 54.

At least a portion of a conduit end 124 of the air injection conduits 120 may extend past the outer annular wall 100 of the exhaust diffuser 54. The conduit end 124 may be configured to be coupled to the air source 26 and provide the cooling air 70 to the first mixing region 115 for mixing with the exhaust gas stream 46. For example, in the illustrated embodiment, a downstream-facing surface 126 (e.g., facing the downstream direction 50) of each of the air injection conduits 120 may include an arrangement of air injection holes 128. The air injection conduit 120 may include any number of air injection holes 128 distributed in any suitable pattern (e.g., rows, staggered, etc.) along the downstream-facing surface 126. For example, the air injection conduits 120 may include between 1 and 100 air injection holes 128. For example, the air injection conduits 120 may include 1, 2, 3, 4, 5, 6, 7, 8, 9, 10, 15, 20, 30, 50, 60, 70, 80 or more air injection holes 128. However, any suitable number of injection holes 128 may be used. As discussed in further detail below, the air injection holes 128 may be oriented at the same or different angles relative to the axial axis 82 (e.g., perpendicular or acutely angled at 10, 20, 30, 40, 50, 60, 70, or 80 degrees). In certain embodiments, some of the air injection holes 128 may have a shape and/or a diameter that is different from a shape and/or diameter of an adjacent air injection hole 128. The orientation and geometry of the air injection holes 128 may allow the cooling air 70 to flow into the first mixing region 115 at a desirable velocity, to achieve a certain amount of swirl, and so forth, to promote uniform mixing with the exhaust gas stream 46 such that a desirable temperature distribution of the cooled exhaust gas 74 is achieved.

In addition to the air injection holes 128, the hub 116 may include a central air injection hole, such as one or more central air injection holes 130. The central air injection hole 130 may receive the cooling air 70 from at least one air injection conduit 120, as illustrated in FIG. 2. However, in other embodiments, the hub 116 may receive the cooling air 70 directly from the air source 26 (e.g., via a dedicated conduit).

In certain embodiments, the outer annular wall 100 may include features that allow injection of the cooling air 70 downstream of the center body 96. As illustrated in FIG. 2, the exhaust diffuser 54 may include additional air injection assembly 134 arranged circumferentially 86 about the centerline axis 90 along the outer annular wall 100 of the exhaust diffuser 54. Similar to the air injection conduits 120, the additional air injection assembly 134 includes an air conduit 136 that receives and injects the cooling air 70 from the air source 26 into a second mixing region 140 of the exhaust diffuser 54. For example, the illustrated air conduit 136 includes air injection holes 138 circumferentially 86 spaced apart about the centerline axis 90 along the air conduit 134. Similar to the air injection holes 128, the air injection holes 138 may be oriented at the same or different angles relative to the axial axis 82 (e.g., perpendicular or acutely angled at 10, 20, 30, 40, 50, 60, 70, or 80 degrees). A geometry and size of the air injection holes 138 may be the same or different about the circumferential axis 86 along the air conduit 136.

The mixing regions 115, 140 extend a portion of the length 97 of the exhaust diffuser 54. For example, the first mixing region 115 extends a dimension 142 between the air injection assemblies 68, 134, and the second mixing region 140 extends a dimension 146 between the additional air injection assembly 134 and the diffuser downstream end 108. Each dimension 142, 146 may be between approximately 5% and 50% of the length 97 of the exhaust diffuser 54. In certain embodiments, the dimensions 142, 146 may be the same. In other embodiments, the dimensions 142, 146 may be different. The air injection assemblies 68, 134 may inject the cooling air 70 into the respective mixing regions 115, 140 simultaneously or in series. For example, the air injection assembly 134 may inject the cooling air 70 at any time after the air injection assembly 68 injects the cooling air 70 into the first mixing region or vice versa. In other embodiments, only one air injection assemblies 68, 134 may be used.

Additionally, at least a portion of the cooling air 70 may be injected into the exhaust diffuser 54 downstream of the hollow struts 112. For example, as discussed above, the hollow center struts 106b may be configured to receive the cooling air 70 and inject the cooling air 70 into the exhaust diffuser 54. Injecting the cooling air 70 downstream of the hollow struts 112 may further increase the residence time of the exhaust gas and cooling air mixture in the exhaust diffuser 54. Moreover, the cooling air 70 may cool the exhaust diffuser 54 (e.g., the walls 98, 100, the hollow struts 112, etc.). Cooling the exhaust diffuser 54 with the cooling air 70 may mitigate degradation of the exhaust diffuser 54 due, in part, to the high temperatures of the exhaust gas stream 46 exiting the turbine 22. As such, overall life of the exhaust diffuser 54 may be extended. Moreover, the exhaust diffuser 54 may be manufactured from less expensive lower temperature alloy materials compared to the alloy materials (e.g., 347 stainless steel) that are used in exhaust diffusers that are not configured to be cooled with cooling air. By way of example, the exhaust diffuser 54 may be manufactured from 321H, 321, 316, 304 stainless steel or any other suitable materials.

As noted above, it is now recognized that injection cooling air 70 into one or both of the mixing regions 115, 140 via the air injection assemblies 68, 134, respectively, a mixture of the exhaust gas stream 46 and cooling air 70 may have a longer residence time within the exhaust treatment system 14 compared to systems that inject the cooling air downstream of the exhaust diffuser 54 (e.g., in the transition section 56). For example, the mixture may continue to mix and cool as it flows through the mixing regions 115, 140 and the transition section 56, unlike existing systems where the cooling air is injected into the transition section (e.g., the transition section 56). The longer residence time of the mixture of the exhaust gas stream 46 and the cooling air 70 in the exhaust treatment system 14 may increase thermal mixing (e.g., mixing of the cooling air 70 and the exhaust gas stream 46), promoting more uniform temperature distribution within the cooled exhaust gas stream 74.

Moreover, a size of cooling fans that may be used to inject the cooling air 70 into the exhaust diffuser 54 may be smaller compared to a size of cooling fans used to inject the cooling air into, for example, the transition section 56, due to the longer residence time of the mixture of the exhaust gas stream 46 and the cooling air 70. The cooling air 70 injected into the exhaust diffuser 54 may be at a higher temperature compared to cooling air that is injected into the transition section 56 as a result of the longer residence time of the mixture of exhaust gas stream 46 and the cooling air 70 in the exhaust processing system 14. As such, a smaller cooling fan may be used due to the lower energy requirement to cool the cooling air 70 injected into the exhaust diffuser 54 compared to cooling air injected into the transition section 56.

Figure 3:
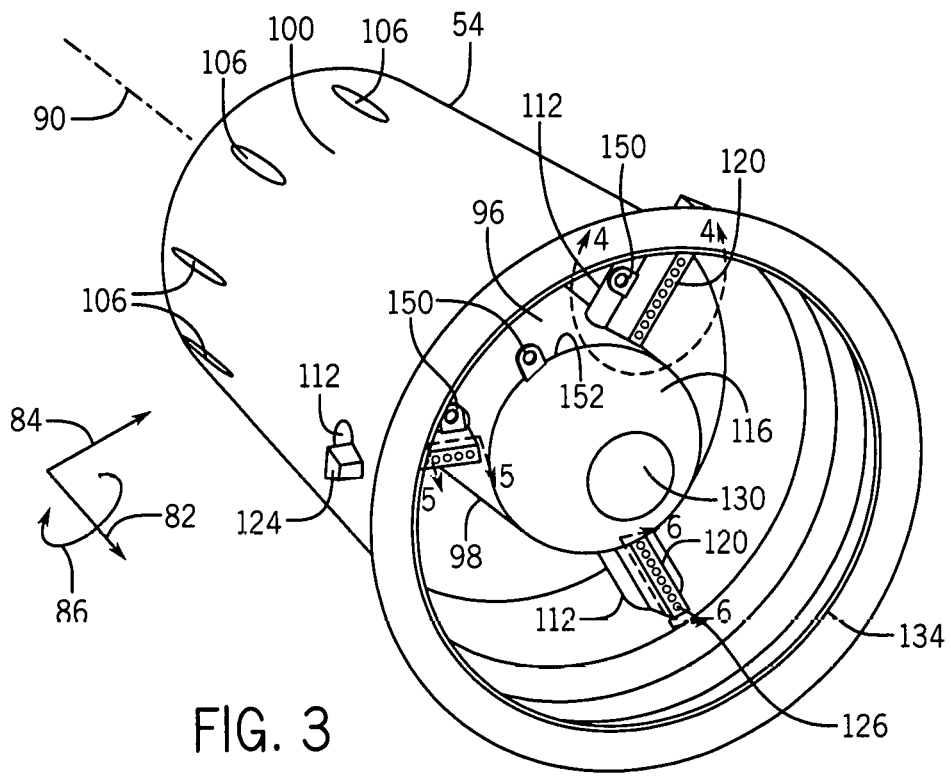
FIG. 3 is a perspective view of the exhaust diffuser of FIG. 2 that includes an air injection assembly, the air injection assembly includes air injection conduits secured to hollow struts of the exhaust diffuser, in accordance with an embodiment of the present disclosure.

The arrangement of the exhaust diffuser 54 may be further appreciated with reference to FIG. 3, which is a perspective view of a portion of the exhaust diffuser 54 having the air injection assembly 68 coupled to the center body 96 and the hollow struts 112. In the illustrated embodiment, the air injection conduits 120 are circumferentially 86 spaced apart at different circumferential positions about the axial axis 90. The air injection assembly 68 may include greater than or equal to 1, 2, 3, 4, 5, 6, 7, 8, 9, 10, 15, 20, 25, 30, 40, 50, or more air injection conduits 120 and air injection holes 128. As discussed above, the air injection conduits 120 extend between the inner annular wall 98 and the outer annular wall 100 of the exhaust diffuser 54, and fluidly couple the air source 26 with the air injection holes 128. The air injection holes 128 supply a flow of the cooling air 70 into the first mixing region 115 for mixing with the exhaust gas stream 46. In the illustrated embodiment, the air injection conduits 120 and the hollow struts 112 are circumferentially 86 aligned with the hollow struts 112, such that the air injection conduits 120 are generally oriented along the radial axis 84 that intersects with the axial axis 90. This may enable desirable flow characteristics to promote uniform mixing between the exhaust gas stream 46 and the cooling air 70.

The air injection assembly 68 may be fixedly or removably attached to the exhaust diffuser 54. For example, in one embodiment, the hub 116 and/or the air injection conduits 120 may be welded to the center body 96 and the hollow struts 112, respectively, of the exhaust diffuser 54. In other embodiments, the hub 116 and/or the air injection conduits 120 may include one or more coupling features that facilitate coupling and securing the hub 116 and air injection conduits 120 to the center body 96 and the hollow struts 112. For example, the hub 116 may include one or more flanges 150 on an outer surface of the hub 116 and/or air injection conduits 120. The flanges 150 may align with a complementary coupling feature (e.g., flange, opening) on the center body 96 and/or hollow struts 112. The hub 116 may have more than one flange 150 circumferentially 86 spaced apart along a perimeter of a bottom end 152 (e.g., end adjacent to the center body downstream end 114). The flanges 150 may be secured, e.g., via screws, bolts, snaps, or any other suitable fastener, to the complementary coupling feature on the center body 96. This coupling arrangement may facilitate retrofitting existing exhaust diffusers with the air injection assembly 68.

In certain embodiments, the hub 116 and/or the air injection conduits 120 may include protrusions and/or recesses that interface with the center body 96 and hollow struts 112, respectively. For example, the hub 116 may include protrusions and/or recesses on a surface at the bottom end 152 that is complementary to protrusions and/or recesses on a downstream end surface of the center body 96. The protrusions and/or recesses may couple to a complementary protrusion/recess on the downstream end surface of the center body 96 (e.g., via interference fit or other coupling arrangement) to secure the hub 116 and the center body 96. The coupling features may allow the air injection assembly 68 to be removably coupled to the exhaust diffuser 96. By removably coupling the air injection assembly 68 to the exhaust diffuser 54, the air injection assembly 68 may be removed during system maintenance (e.g., cleaning) or replacement of the system components. Accordingly, equipment and maintenance cost associated with the system 10 may be decreased.

Figure 4:
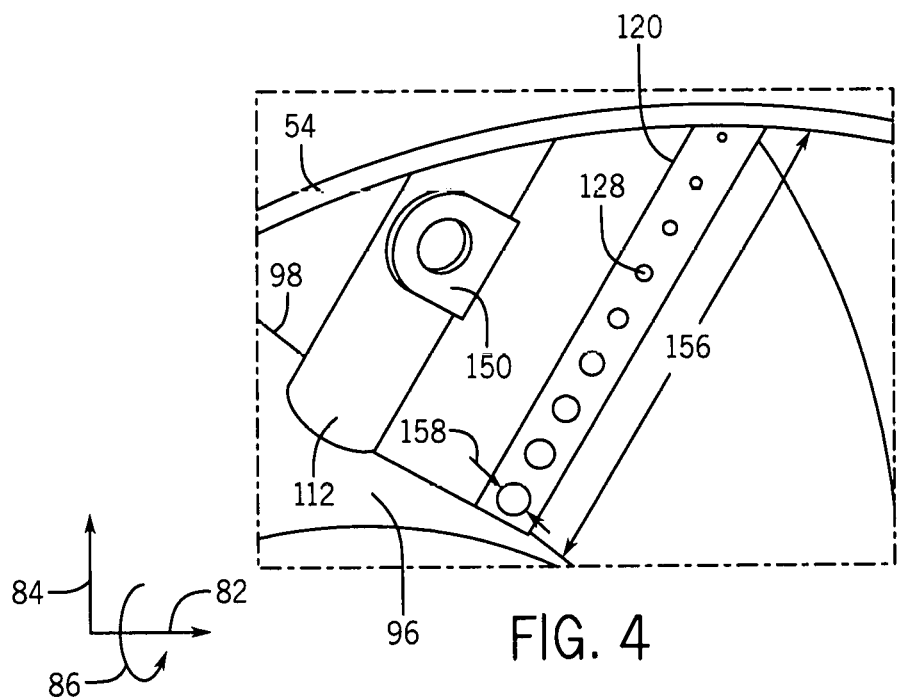
FIG. 4 is a cutaway perspective view of an embodiment of a portion of an air injection conduit of the air injection assembly of FIG. 3, the air injection conduit includes air injection holes having different diameters along a length of the air injection conduit, in accordance with an embodiment of the present disclosure.

As discussed above, the hub 116 injects the cooling air 70 into the first mixing region 115 via the air injection holes 126 on the air injection conduits 120. FIG. 4 illustrates a perspective view of a portion of the air injection conduit 120 having the air injection holes 128 radially 84 spaced apart along at least a portion of a length 156 of the air injection conduit 120. While in the illustrated embodiment the air injection holes 128 are arranged in a single row along the radial direction 84, the air injection holes 128 may be arranged in multiple rows or any other suitable pattern along the radial direction 84. The rows may be arranged such that the air injection holes 128 of each row is aligned or offset with respect to an air injection hole 128 in an adjacent row. In addition, the air injection holes 138 of the air conduit 136 may also be arranged similar to the air injection holes 128. In the illustrated embodiment, the air injection holes 128 have a circular geometry. However, the air injection holes 128 may be square-shaped, diamond-shaped, elliptical-shaped, slot-shaped, rectangular-shaped, or may be configured in other suitable type of geometric configuration.

A diameter 158 (or other dimension) of the air injection holes 128 along the air injection conduit 120 may be variable. For example, in one embodiment, the diameter 158 may decrease with respect to a corresponding diameter 158 (or other corresponding dimension) of an adjacent air injection hole 128. That is, a first of the air injection holes 128 adjacent to the inner annular wall 98 (e.g., the center body 96) may have a larger diameter 158 compared to the corresponding diameter 158 of a second of the air injection holes 128 adjacent to the outer annular wall 100. By way of non-limiting example, the diameter 158 of the air injection hole 128 adjacent to the inner annular wall 98 may be 1 to 5 times greater than the diameter 158 of the air injection hole 128 adjacent to the outer annular wall 100. In another embodiment, the diameter 158 of the air injection holes 128 may increase in the radial direction 84 away from the inner annular wall 98. In other embodiments, the diameter 158 may alternate from large to small in the radial direction 84 along the length 156 of the air injection conduit 120. The air injection holes 138 of the additional air injection assembly 134 may have a similar configuration. The diameter 158 of the air injection holes 128 may be associated with a velocity of the cooling air 70 injected into the exhaust diffuser 54. By varying the diameter 158 of the air injection holes 128, the cooling fluid 70 may be injected into the first mixing region 115 at various velocities. The variable velocity of the cooling air 70 and the exhaust gas stream 46 (e.g., the exhaust gas stream 46 may have a variable velocity due, in part, to diffusion in the exhaust diffuser 54) may facilitate turbulent flow, which may improve mixing and flow distribution of the exhaust gas stream 46 and the cooling air 70. Therefore, the cooled exhaust gas stream 74 may have a more uniform temperature distribution (e.g., based on a cross-section of the mixture taken at an axial position). By way of example, the diameter 158 of the air injection holes 128 may be between approximately 2 inches and approximately 7 inches.

Figure 5:
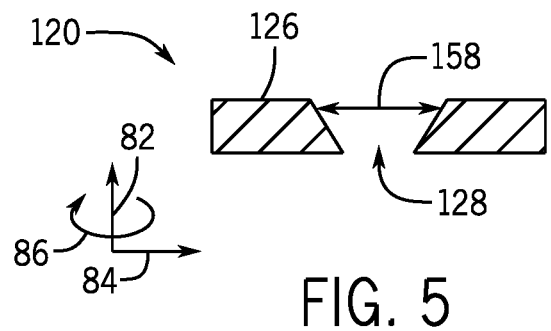
FIG. 5 is a cross-sectional view of an embodiment of a portion of the air injection conduit along line 5-5 of the air injection assembly of FIG. 3 along line 5-5, the air injection conduit includes an air injection hole having a variable diameter in an axial direction of the exhaust diffuser, in accordance with an embodiment of the present disclosure.

In certain embodiments, the air injection holes 128 may also have a variable diameter in the axial direction 82. For example, FIG. 5 is a cross-sectional view of a portion of the air injection conduit 120 having one or more of the air injection holes 128 with a variable diameter 158 in the axial direction 82. In the illustrated embodiment, the diameter 158 of the air injection holes 128 increases in the axial direction 82 toward the downstream-facing surface 126. In other embodiments, the diameter 158 may increase in the axial direction 82 away from the downstream-facing surface 126.

Varying the diameter 158 in the axial direction 82 allow the cooling air 70 to enter the exhaust diffuser 54 at a velocity and flow distribution suitable to achieve uniform mixing of the exhaust gas stream 46 and cooling air 70. Additionally, the improved flow distribution of the cooling air 70 may reduce backpressure in the gas turbine system 10 and improve performance of the exhaust diffuser 54.

Figure 6:
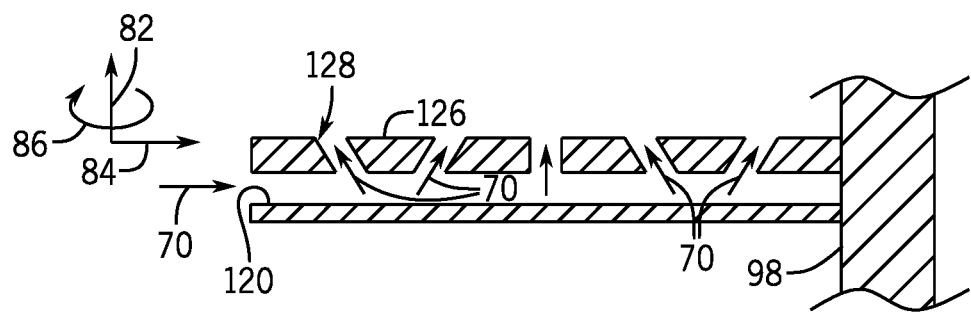
FIG. 6 is a cross-sectional view of an embodiment of the air injection conduit along line 6-6 of the air injection assembly of FIG. 3, the air injection conduit having air injection holes oriented at different angles relative to a centerline axis of the exhaust gas diffuser, in accordance with an embodiment of the present disclosure.

In certain embodiments, the air injection holes 128 may be oriented at an angle relative to the axial direction 82. FIG. 6 illustrates a cross-sectional view of a portion of an embodiment of the air injection conduit 120. As discussed above, the air injection holes 128 direct the cooling air 70 into the first mixing region 115. For example, the cooling air 70 may flow through the air injection conduits 120 in the radial direction 84 toward the inner annular wall 98 of the exhaust diffuser 54. The air injection holes 128 of FIG. 6 change a flow direction of the cooling air 70 from the radial direction 84 to the axial direction 82 toward the first mixing region 115 downstream of the air injection assembly 68. In such an embodiment, the additional air injection assembly 134 may also direct the cooling air 70 into the second mixing region 140 in a similar manner.

As shown in FIG. 6, the air injection holes 128 are angled (e.g., perpendicularly or acutely angled at 10, 20, 30, 40, 50, 60, 70, or 80 degrees) relative to the axial axis 82 of the exhaust diffuser 54. The angle of the air injection holes 128 may vary a direction of the cooling air 70 relative to the axial direction 82 within the first mixing region 115. While in the illustrated embodiment, each air injection holes 128 has a different angle relative to the an adjacent air injection opening 128, the angle of the air injection openings 128 may vary depending on the particular characteristics of the exhaust gas stream 46 in a given application. For instance, the angle of the air injection holes 128, in conjunction with the size and shape of the air injection holes 128, may be selected to provide for generally uniform mixing, uniform temperature, and/or velocity distributions of the cooled exhaust gas stream 74, as well as improved flow distribution, prior to SCR processing by the SCR system 60.

In addition to improving cooling of the exhaust gas stream 46, positioning the air injection assembly 68 within the exhaust diffuser 54 may also improve performance of the exhaust diffuser 54 compared to exhaust diffusers that do not include the air injection assembly 68. For example, it is presently recognized that the central body 96 and the hollow struts 112 of exhaust diffusers generally form large wake regions in the flow of the exhaust gas stream 46 through the exhaust diffuser due, in part, to the blunt end (e.g., the center body downstream end 114) of the center body 96 and the cylindrical shape of the hollow struts 112. As such, the center body downstream end 114 and the hollow struts 112 may create a reverse flow region downstream of the center body 96, which may decrease exhaust diffuser performance by allowing flow of the exhaust gas stream 46 in a direction substantially opposite the downstream direction 50. This results in an unintended pressure loss within the exhaust diffuser 54. Consequently, the pressure of the exhaust gas stream 46 is decreased such that a flow energy of the exhaust gas stream is decreased at least until the exhaust gas stream exits the exhaust diffuser. The decrease in pressure and flow energy of the exhaust gas stream may decrease the effectiveness of the diffusion of the exhaust gases in the exhaust diffuser. The ineffective diffusion of the exhaust gases within the exhaust diffuser may result in a decrease in pressure recovery of the system 10 and non-uniform mixing of the cooling air and the exhaust gas stream downstream of the exhaust diffuser. However, by positioning the air injection assembly 68 on the center body downstream end 114, the large wake regions and reverse flow regions resulting from the blunt center body downstream end 114 may be decreased.

Figure 7:
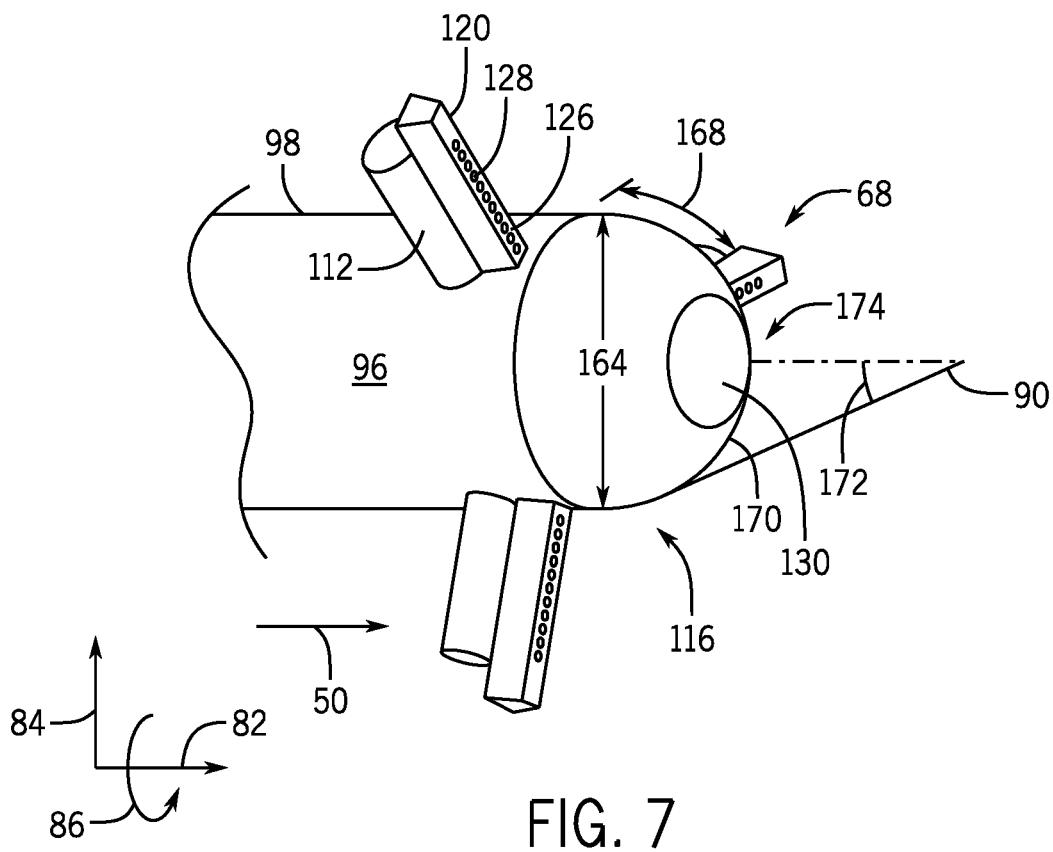
FIG. 7 is a detailed perspective view of an embodiment of the air injection system of FIG. 3 including a manifold having a central hub with a curved surface, in accordance with an embodiment of the present disclosure.

For example, as shown in FIG. 7, a hub diameter 164 of the hub 116 gradually decreases along the centerline axis 90 in the downstream direction 50, such that the angle 172 relative to the centerline axis 90 and the hub diameter 164 decreases in the downstream direction 50 of the hub 116. The decreasing hub diameter 164 creates a curvature 168 on a hub surface 170 (e.g., convex outer surface). The curvature 168 of the hub surface 170 may improve the flow dynamics of the exhaust gas stream 46 within the exhaust diffuser 54. For example, the curvature 168 may minimize flow separation of the exhaust gas stream 54 that results in large wake and reverse flow regions. Accordingly, the exhaust diffuser 54 may use the pressure of the exhaust gas stream 46 to more efficiently flow the exhaust gas stream 46 through the exhaust treatment processing system 14. Indeed, a high pressure recovery and a more desirable pressure drop across the system 10 may be achieved compared to systems that do not include the air injection assembly 68 within the exhaust diffuser 54. This may result in a more desirable flow distribution of the mixture. Consequently, the cooled exhaust gas 74 may have the desirable temperature distribution for efficient removal or reduction of $NO_x$ by the SCR system 60.

The central air injection hole 130 positioned at a tip 174 of the hub 116 may also facilitate cooling by injecting additional cooling air 70 to the mixture of the exhaust gas stream 46 and the cooling air 70. While in the illustrated embodiment, the tip 174 includes a single air injection hole 130, the tip 174 may include multiple air injection holes 130 circumferentially 86 spaced apart at any circumferential and axial position along the hub 116. The air injection hole(s) 130 may further facilitate uniform mixing and cooling of the exhaust gas stream 46 due, in part, to the turbulent flow that may be created when the cooling air 70 is injected into the exhaust diffuser 54.

Figure 8:
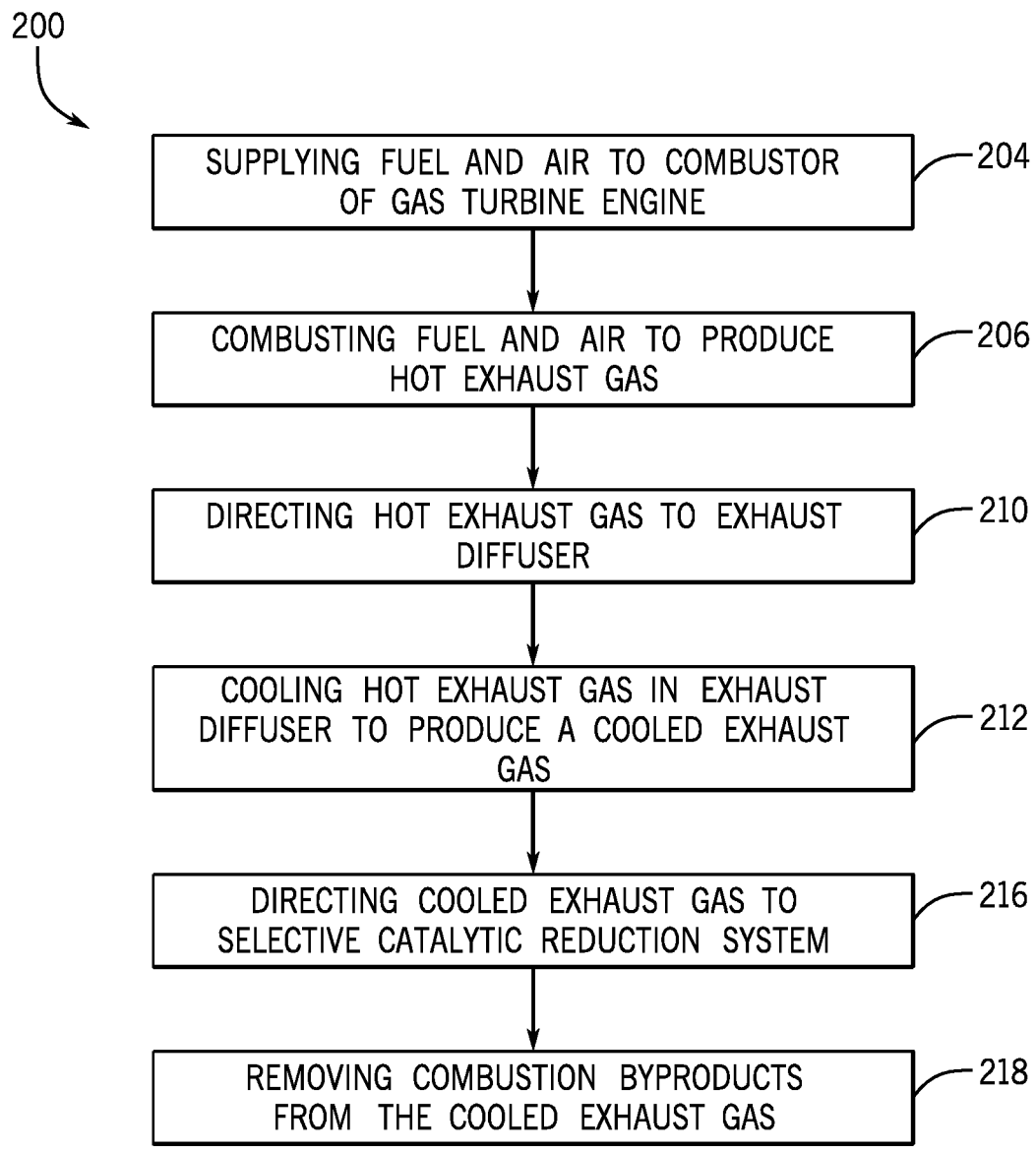
FIG. 8 is a flow diagram of a method of cooling exhaust gases in the exhaust diffuser using the air injection assembly of FIG. 3, in accordance with an embodiment of the present disclosure.

In accordance with various embodiments described above, the gas turbine system 10 may operate more efficiently, and may generate lower emissions than other systems. FIG. 8 illustrates a flow diagram of a method 200 by which a gas turbine system (e.g., the gas turbine system 10 described above) may cool an exhaust gas stream (e.g. the exhaust gas stream 46) in an exhaust diffuser (e.g., the exhaust diffuser 54) in accordance with such embodiments. The method 200 includes supplying the combustor 20 of the gas turbine engine 12 with fuel 36 and the compressed air 34 (block 204), and combusting the fuel 36 and the compressed air 34 to produce the exhaust gas stream 46 (block 206), as described above with reference to FIG. 1.

The exhaust gas stream 46 may include combustion byproducts, such as nitrogen oxides ($NO_x$), sulfur oxides ($SO_x$), carbon oxides ($CO_x$), and unburned hydrocarbons that may need to be reduced or removed (e.g., to achieve certain emission levels). Therefore, the exhaust gas stream 46 may undergo treatment in the exhaust treatment system 14 to remove these byproducts. The exhaust gas treatment process may include reacting the exhaust gas stream 46 with the reductant 62 in the presence of a catalyst in the SCR system 60. The efficiency of the catalyst may be affected by the elevated temperatures of the exhaust gas stream 46 exiting the turbine 22. Therefore, the exhaust gas stream 46 may be cooled before undergoing treatment in the SCR system 60. Accordingly, the method 200 also includes directing the exhaust gas stream 46 from the turbine 22 to the exhaust diffuser (block 210), and cooling the exhaust gas stream 46 in the exhaust diffuser 54 to generate the cooled exhaust gas 74 (block 212). For example, the air injection assemblies 68, 134 may inject the cooling air 70 into mixing regions 115, 140 of the exhaust gas diffuser 54. The cooling fluid 70 mixes with the exhaust gas stream 46, thereby cooling the exhaust gas stream 46 as the exhaust gas stream 46 flows through the mixing regions 115, 140 of the exhaust diffuser 54 and subsequently the transition section 56. By initiating the cooling process of the exhaust gas stream 46 in the exhaust diffuser 54, the residence time of the exhaust gas and cooling fluid mixture within the exhaust processing system 14 may be increased. As such, the cooled exhaust gas 74 may have a uniform temperature distribution. Additionally, positioning the air injection assemblies 68, 134 within the exhaust diffuser 54 may increase diffuser performance due, in part, to a higher pressure recovery and a lower total pressure drop across the system 10 compared to system that do not include an air injection assembly in the exhaust diffuser, as discussed above.

The method 200 further includes directing the cooled exhaust gas stream 74 to the SCR system 62 to remove the nitrogenous byproducts generated during combustion of the fuel 36 (block 216), and removing the combustion byproducts from the cooled exhaust gas 74 (block 218). As discussed above, the efficiency of the catalyst used to reduce $NO_x$ in the exhaust gas stream 46 to nitrogen ($N_2$) and water ($H_2O$) may be affected by the temperature of the exhaust gas stream 46 at the time of the SCR process. Exhaust gas streams cooled downstream of the exhaust diffuser (e.g., the exhaust diffuser 54) may not properly mix with the cooled air, resulting in inefficient cooling of the exhaust gas stream. Again, the uniform temperature distribution of the cooled exhaust gas stream 74 may improve the efficiency of the SCR process, and decrease an amount of $NO_x$ emissions to levels at or below approximately 3 ppm.

As discussed above, the various techniques set forth herein may provide for the injection of cooling air into an exhaust gas stream in order to enhance the uniformity of the temperature and/or velocity distributions of the exhaust gas stream, while also cooling the exhaust gas stream to enhance the effectiveness of a selective catalyst reduction process. For instance, the techniques disclosed include placing one or more air injection assemblies within an exhaust gas diffuser. At least one air injection assembly may be positioned adjacent to a center body of the exhaust gas diffuser. Positioning at least one air injection assembly adjacent to the center body of the exhaust diffuser may improve pressure recovery and decrease total pressure loss of the system that may result from reverse flow regions created by the blunt downstream end of the center body and hollow struts associated with the exhaust diffuser. Additionally, the techniques disclosed herein could cover any combination of constant or varying air injection hole diameters, hole spacings, hole geometries, or any combination thereof that improve the flow distribution and/or velocity of the exhaust gas stream to allow uniform mixing of the exhaust gas stream and the cooling air. Moreover, adding the cooling air to the exhaust gas stream while in the exhaust diffuser may increase a residence time of the exhaust gas stream and cooling air mixture. Therefore, the exhaust gas stream and the cooling air may more time to mix, thereby increasing temperature uniformity compared to systems that add the cooling air downstream of the exhaust diffuser. Again, it should be understood that the disclosed techniques and configurations of the air injection assembly 68, 134 are intended to be only examples of certain embodiments, and should be construed as being limiting in any way.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gas turbine system, comprising:
an exhaust processing system configured to process exhaust gas generated by a gas turbine engine, the exhaust processing system comprising an exhaust diffuser configured to receive the exhaust gas from a turbine of the gas turbine engine and having an annular passage disposed between an outer annular wall and an inner wall defined by a center body;
one or more struts extending radially between the inner wall and the outer annular wall, wherein each strut of the one or more struts is symmetric about a respective centerline axis of the strut;
a fluid injection assembly disposed within the exhaust diffuser, wherein the fluid injection assembly comprises one or more fluid injection conduits disposed within the annular passage of the exhaust diffuser and comprising fluid injection holes configured to direct a fluid into a first mixing region of the exhaust diffuser, wherein at least one fluid injection conduit of the one or more fluid injection conduits extends radially between the inner wall and the outer annular wall and a respective cross-section of the at least one fluid injection conduit is symmetric about an axially extending plane of the at least one fluid injection conduit, wherein each of the one or more fluid injection conduits is coupled to a downstream portion of a respective strut of the one or more struts, wherein the fluid injection assembly comprises a central hub coupled to the one or more fluid injection conduits and disposed on a downstream end of the center body of the exhaust diffuser, wherein a diameter of the central hub decreases in a direction away from the downstream end of the center body such that the central hub has a convex outer surface, and wherein the central hub comprises a central fluid injection hole disposed on the apex of the convex outer surface of the central hub, the central fluid injection hole being oriented to inject fluid along a downstream direction of the exhaust diffuser, wherein the central fluid injection hole is fluidly coupled to at least one of the one or more fluid injection conduits, wherein each of the one or more fluid injection conduits comprises a first side abutting a respective strut of the one or more struts, and wherein each of the one or more fluid injection conduits decreases in width from the first side in the downstream direction.

2. The system of claim 1, wherein each of the one or more fluid injection conduits has a conduit wall having a downstream wall portion, the downstream wall portion aligns with a base of the central hub, and the downstream wall portion and the base are axially spaced downstream from the downstream end of the center body.

3. The system of claim 1, wherein a dimension of the fluid injection holes of the one or more fluid injection conduits varies from the central hub to the outer annular wall along a radial length of the respective fluid injection conduit.

4. The gas turbine system of claim 1, comprising an additional fluid injection assembly coupled to the outer annular wall of the exhaust diffuser, wherein the additional fluid injection assembly comprises a fluid passage disposed circumferentially about a centerline diffuser axis of the exhaust diffuser, and wherein the fluid passage is positioned downstream of the central hub and adjacent to a downstream end of the exhaust diffuser, wherein the additional fluid injection assembly is configured to direct additional cooling fluid into a second mixing region of the exhaust diffuser that is downstream from the first mixing region.

5. The gas turbine system of claim 4, wherein the additional fluid injection assembly comprises a circumferential conduit having the fluid passage, and the circumferential conduit is coupled directly to the outer annular wall circumferentially about the centerline diffuser axis.

6. The system of claim 1, wherein each of the one or more struts comprise a cylindrical strut.

7. An exhaust diffuser, comprising:
a center body extending at least a portion of a length of the exhaust diffuser;
an outer annular wall circumferentially surrounding an inner wall defined by the center body to define an annular passage, wherein the annular passage is configured to receive an exhaust gas from a turbine of a gas turbine engine;
a plurality of support struts extending from the inner wall to the outer annular wall, wherein each support strut of the plurality of support struts is symmetric about a respective centerline axis of the support strut; and
a fluid injection assembly comprising a plurality of fluid injection conduits, wherein at least one fluid injection conduit of the plurality of fluid injection conduits extends radially between the inner wall and the outer annular wall and a respective cross-section of the at least one fluid injection conduit is symmetric about an axially extending plane of the at least one fluid injection conduit, wherein each fluid injection conduit of the plurality of fluid injection conduits is coupled to a downstream portion of one of the plurality of support struts, wherein each fluid injection conduit of the plurality of fluid injection conduits comprises one or more fluid injection holes configured to supply a fluid into a region of the exhaust diffuser downstream from the respective one of the plurality of support struts, wherein each fluid injection conduit of the plurality of fluid injection conduits comprises a first side abutting a respective support strut of the plurality of support struts, and wherein each fluid injection conduit of the plurality of fluid injection conduits decreases in width from the first side in a downstream direction.

8. The exhaust diffuser of claim 7, wherein the fluid injection assembly comprises a central hub coupled to the center body, wherein the central hub has a base adjacent to the center body, a cross-sectional area that gradually decreases in the downstream direction away from the base to an apex, and a central opening disposed from the base to the apex, wherein the apex and the central opening are centered along a central axis of the center body.

9. The exhaust diffuser of claim 7, wherein each of the one or more fluid injection conduits has opposite sides that are angled toward one another in the downstream direction.

10. The exhaust diffuser of claim 7, wherein each of the plurality of fluid injection conduits overlaps a downstream end of the center body of the exhaust diffuser.

11. The exhaust diffuser of claim 7, comprising an additional fluid injection assembly disposed downstream from the fluid injection assembly, wherein the additional fluid injection assembly comprises a circumferential conduit having a fluid passage, the circumferential conduit is coupled directly to the outer annular wall circumferentially about a centerline diffuser axis of the exhaust diffuser, and the circumferential conduit comprises a plurality of additional fluid injection holes.

12. The diffuser of claim 7, wherein a respective diameter of each of the plurality of fluid injection holes varies in a radial direction between the inner wall and the outer annular wall of the exhaust diffuser.

13. A system, comprising:
an exhaust diffuser, comprising:
a center body comprising a first wall extending about a central axis;
an exhaust passage disposed circumferentially about the first wall;
a second wall disposed circumferentially about the exhaust passage;
a plurality of hollow struts extending radially between the first and second walls, wherein each of the plurality of hollow struts is a cylindrical hollow strut; and
a plurality of fluid injection conduits, wherein each of the plurality of fluid injection conduits is coupled to a downstream portion of a respective one of the plurality of hollow struts, and each of the plurality of fluid injection conduits comprises a plurality of fluid injection holes, and wherein each of the plurality of fluid injection conduits comprises a first side abutting a respective strut of the plurality of hollow struts, and wherein each of the plurality of fluid injection conduits decreases in width from the first side in a downstream direction.

14. The system of claim 13, comprising a central hub coupled to the plurality of fluid injection conduits, wherein the central hub protrudes in the downstream direction away from a downstream end of the center body.

15. The system of claim 14, wherein the central hub comprises a fluid injection opening centered along the central axis of the center body.

16. The system of claim 14, wherein each of the plurality of fluid injection conduits has a conduit wall having a downstream wall portion, the downstream wall portion aligns with a base of the central hub, and the downstream wall portion and the base are axially spaced downstream from the downstream end of the center body.

17. The system of claim 14, wherein the central hub is removably coupled to the center body.

18. The system of claim 13, comprising a circumferential conduit having a plurality of additional fluid injection holes, wherein the circumferential conduit is disposed downstream from the plurality of fluid injection conduits, and the circumferential conduit is coupled directly to the second wall circumferentially about a centerline diffuser axis of the exhaust diffuser.

19. The system of claim 13, wherein each conduit of the plurality of injection conduits extends radially between the first and second walls and a cross-section of the respective conduit is symmetric about an axially extending plane of the conduit.

* * * * *